United States Patent [19]

Henmi et al.

[11] Patent Number: 4,733,385
[45] Date of Patent: Mar. 22, 1988

[54] SIGNAL RECORDING AND REPRODUCING APPARATUS FOR AN OPTO-MAGNETIC DISK

[75] Inventors: Fumiaki Henmi, Kanagawa; Kiyoshi Ohsato, Chiba; Tamotsu Yamagami, Kanagawa, all of Japan

[73] Assignee: Sony Corporation, Tokyo, Japan

[21] Appl. No.: 844,190

[22] Filed: Mar. 26, 1986

[30] Foreign Application Priority Data

Mar. 27, 1985 [JP] Japan ................. 60-060889
Apr. 7, 1985 [JP] Japan ................. 60-187888

[51] Int. Cl.$^4$ ........................................... G11B 11/12
[52] U.S. Cl. ........................................... 369/13; 360/8; 360/57; 360/59; 360/114; 365/122
[58] Field of Search ............... 369/13, 100, 32; 360/8, 360/59, 114, 57; 365/122; 371/31

[56] References Cited

U.S. PATENT DOCUMENTS

| | | | |
|---|---|---|---|
| 3,789,137 | 7/1978 | Newell | 360/8 |
| 4,138,694 | 2/1979 | Doi et al. | 360/8 |
| 4,357,638 | 11/1982 | Yoshimaru et al. | 360/72.2 |
| 4,495,530 | 1/1985 | Yanagida | 369/13 |
| 4,539,662 | 9/1985 | Hatano et al. | 360/114 |
| 4,639,920 | 1/1987 | Kaneko | 371/31 |

FOREIGN PATENT DOCUMENTS

58-083347 5/1983 Japan ................. 369/13

*Primary Examiner*—Raymond F. Cardillo
*Assistant Examiner*—Hoa T. Nguyen

[57] ABSTRACT

A signal recording and reproducing device for use with an opto-magnetic disk having a number of concentric recording tracks. An optical head sweeps a given track at least twice during a time interval equal to a predetermined reproduction time for the track. Erasure signals and recording signals are supplied to the optical head during the first time sweeping and the second time sweeping, respectively, in order to effect signal erasure and recording. At the time of switching from the first time sweeping to the second time sweeping, the address data indicating the end point written on the terminal portion of the previously recorded signal area are sensed, and the recording is effected from the thus sensed recording end point.

6 Claims, 14 Drawing Figures

SIGNAL RECORDING AND REPRODUCING APPARATUS FOR AN OPTO-MAGNETIC DISK

BACKGROUND OF THE INVENTION

1. Field of the Invention

This invention relates to a signal recording and reproducing apparatus adapted to record and reproduce data on and from an opto-magnetic disk. More particularly, it relates to such a device by means of which new signals can be recorded within a time interval apparently equal to a time interval required for signal reproduction.

2. Description of the Prior Art

In general, an opto-magnetic recording system is attracting attention in recent years in that data rewriting is feasible with this system in distinction from other optical recording systems such as what is called a direct read after write system (DRAW system). Above all, research is being conducted in the field of practical application of such system along with the opto-magnetic disk as an external computer memory, with a view towards future commercialization.

Figure 1A:
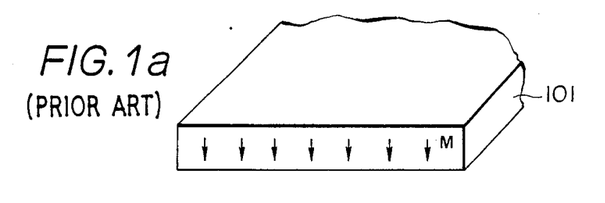
Figure 1B:
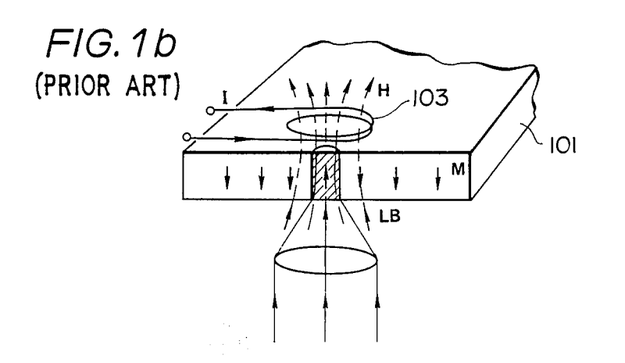
Figure 1C:
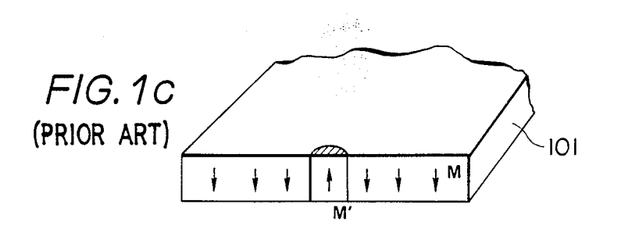

The operating principle of the conventional opto-magnetic recording system shown in FIG. 1 is basically as follows. First of all, a downwardly directed uniform magnetization M is established in a magnetic recording medium 101, such as magnetic disk, as shown in FIG. 1 (a). Then, as a weak bias magnetic field H opposite in direction to the magnetization M is applied from the outside, as shown at (b) in FIG. 1, by a magnetic coil 103 or a permanent magnet, not shown. The disk is irradiated by a light beam, usually a laser beam LB, modulated in accordance with the data signals to be recorded on the disk, for locally elevating the temperature of the irradiated disk portion. This causes the direction of magnetization of the irradiated disk portion to be reversed into coincidence with the direction of the bias field H so that there remains a recorded magnetization M' as shown in FIG. 1 (c). During signal reproduction, the well-known effect of magnetic rotation or the Faraday effect concerning the interaction between the light and the magnetism is utilized so that, when the laser beam sweeps the magnetic recording medium 101, the different angle of rotation of the polarization plane of the laser beam with the different directions of magnetization M or M' is sensed for optically reading the recorded data signals.

When recording the data signals on the previously recorded magnetic medium 101, the laser beam is applied generally on the overall surface of the magnetic medium or to the portion of the medium where the re-recording is desired, for aligning the direction of magnetization of the irradiated portion with the preset constant direction, at this time, the direction of the externally applied bias magnetic field coincides with the direction of the magnetization M. In this manner, the reverse magnetization M' is rearranged to be in alignment with the original direction of magnetization M so that the previously recorded data are erased. Next, the direction of the external magnetic field or bias magnetic field is reversed from that of magnetization M, as in the case of the above described recording operation, and the head unit is caused to sweep the magnetic medium as the laser beam modulated in accordance with the data signals to be re-recorded is irradiated on the magnetic medium.

In the opto-magnetic recording system, as described hereinabove, it is necessary to first erase the old data on the disk with a magnetic field applied thereacross and then to write the new data with the direction of the magnetic field reversed. This causes an inconvenience in that, in contrast to the case of the magnetic tape or the magnetic disk, the magnetic erasure and recording operations cannot be performed simultaneously. Thus, when writing the new data, the time equal to that used for recording will be consumed for erasure, so that the recording time is equal to twice the reproducing time.

Therefore, should the data to be recorded be continuous signals such as music source, real time recording of these signals is not feasible so that the change of recording is lost once and for all, which is a disadvantage as compared to the conventional recording and reproducing system.

OBJECT AND SUMMARY OF THE INVENTION

The present invention is designed to overcome this deficiency and to provide an opto-magnetic disk erasure and recording system wherein the erasure and recording can be performed within a time interval equal to the signal reproduction time interval.

The present invention provides a signal recording and reproducing apparatus for use with an opto-magnetic disk comprising an opto-magnetic disk having a large number of concentric recording tracks on which the information signals or data are recorded, a head unit for recording signals on said disk or for reproducing recorded signals therefrom, recording means for supplying recording signals or erasure signals to said head unit, reproducing means for reproducing signals read by said head unit, and control means operable to cause said head unit to consecutively sweep a given concentric track on said disk and within a time interval necessary for reproducing said given track, said control means also being operable to cause said head unit to be switched between a first time sweeping and a second time sweeping so that said recording means will supply erasure signals to said head unit during said first time sweeping and time-base-compressed recording signals thereto during said second time sweeping.

In accordance with the recording and reproducing apparatus, the signal erasure and recording on the same concentric recording track can be achieved within a time interval equal to the reproduction time interval for one track, while the signal recording can be started at the end point of the previous recording on the previous recorded track area, in such a manner that the signal re-recording, that is, signal erasure and recording, of new data, can be achieved within a time interval equal to the reproduction time interval, while the continuity of the recorded signals is elevated.

Thus, in accordance with the signal recording and reproducing device signal re-recording on a given track, that was feasible with the conventional device in a time interval at least twice the reproduction time for said track, can now be achieved on a real time basis and within a time equal to the reproduction time for said track. In addition, as the signals are re-recorded with alternate erasure and recording of new data on the respective tracks, the terminal portions of the recording tracks can be connected accurately for improving signal continuity.

BRIEF DESCRIPTION OF THE DRAWINGS

FIGS. 1 (a), (b) and (c) show the basic principle of the prior art opto-magnetic recording;

DETAILED DESCRIPTION OF THE PREFERRED EMBODIMENTS

Basic Operation

Figure 2:
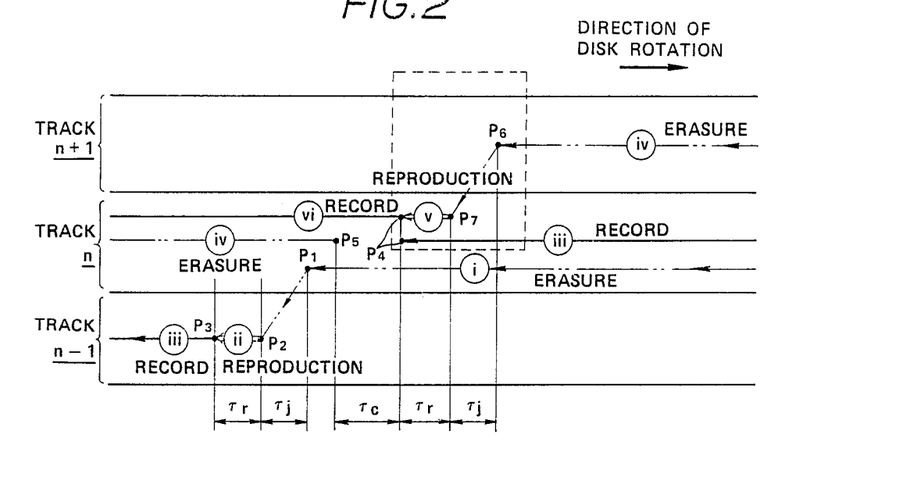
FIG. 2 is a schematic plan view showing the vicinity of the track jump position.

FIG. 2 is a view useful for understanding the basic operation of the magnetic recording and reproducing device in conjunction with the opto-magnetic disk embodying the present invention. In this figure, the portion in the vicinity of the track jump position on the disk 1 shown in FIG. 3 is shown to an enlarged scale.

Figure 3:
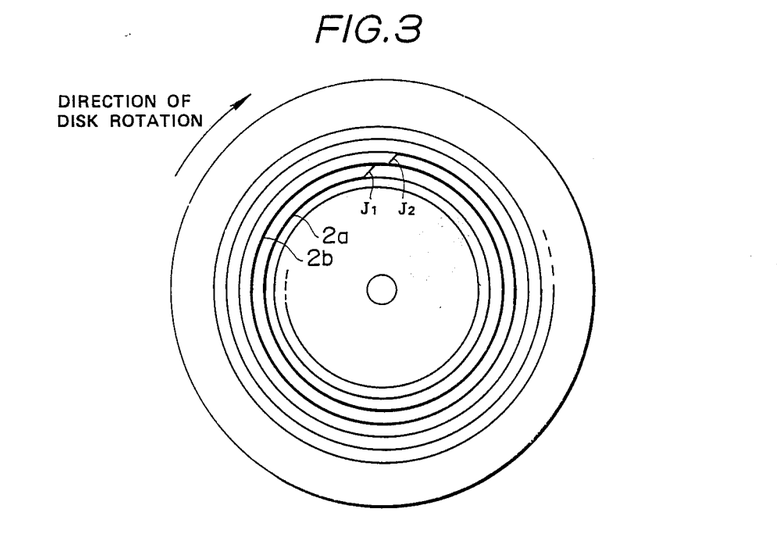
FIG. 3 is a schematic plan view of the opto-magnetic disk.
Figure 4:
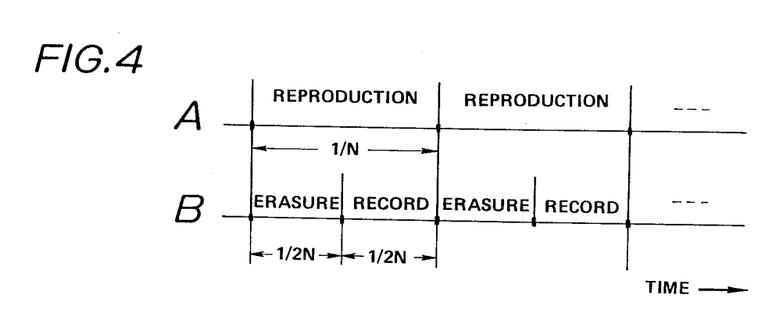
FIG. 4, consisting of a and b, is a time chart showing the relation between the reproduction time interval for one track and the signal erasure and recording time interval.

Referring to FIG. 3, a long continuous track 2 is formed in a convolution or helix from e.g. the inside to the outside of the opto-magnetic disk 1, a short track section corresponding to an angle of ca. 360° is hereafter referred to simply as "track" or "track section". The rotation of the disk 1 is controlled in such a manner that the linear velocity of the disk during the erasure-recording mode operation is equal to at least twice that during the reproduction mode operation. In this manner, the same track is swept twice during the time equal to the signal reproduction time. The first time sweeping is allotted to erasure and the record time sweeping to recording so that signal re-recording, i.e. erasure and recording of new data can be achieved within a time apparently equal to the reproduction time. It is assumed that the number of disk rotation for a given track during signal reproduction is N. The read-out time for the track is equal to 1/N second, as shown at A in FIG. 4. For erasure and recording of the same track, disk rotation is increased to 2N and, as shown at B in FIG. 4, the time ½N second is allocated to erasure while the next ½N second is allocated to recording, so that the erasure and recording is completed within the time interval of 1/N second. It is noted that the data signals to be recorded need be subjected to ½ compression along the time axis.

For sweeping the same track section on the disk 1 twice during the erasure and recording for re-recording, a track section 2a in FIG. 3, for example, is swept first during the erasure mode operation. Then, at $J_1$, the head unit is returned back to the track 2a by jumping one track, this track 2a being swept again but in the record mode. During the next or third rotation, the next track 2b is swept without track jumping. After one complete revolution for sweeping the track 2b, the head unit is returned from point $J_2$ back to the track 2b by jumping over one track. In this manner, track jumping is caused to occur every second revolution for sweeping the same track twice. In this manner, all or a desired portion of the track sections are swept sequentially towards the outer periphery for re-recording, that is, for erasure and recording of new data.

FIG. 2 shows in an enlarged scale the vicinity of the track jump position during the erasure-record mode. In this figure, a track $n-1$, a track $n$ and a track $n+1$ are shown sequentially from the inner towards the outer peripheries with the operation proceeding sequentially from a step marked i to a step marked vi. The reference marks i through vi also indicate the laser beam paths or trajectories shown by the double-dotted chain lines for the erasure mode, the double lines for the reproduction or read-out mode and by the thick solid lines for the recording or writing mode. It is noted that the beam trajectories or paths within one track n are shown to be separated in FIG. 2, however, in effect these beam paths are superimposed one upon the other.

Referring to FIG. 2, upon completion of the erasure mode of the beam path i at a point $P_1$ on the track n track jump occurs during the time $\tau_j$ from the point $P_1$ to a point $P_2$ on the next inner track $n-1$. From this point $P_2$, signal reproduction is caused to occur with beam path ii. Depending on the state of the reproduction signal, the record mode operation is started at a point $P_3$ after the lapse of e.g. a time interval $\tau_r$ with the aid of the beam path iii. During this record mode operation, the signals compressed to one half along the time base as described hereinabove are recorded for about one track length from which the data have been erased by the beam path i. The record mode is completed at a point $P_4$ of the track n ahead of the point $P_1$. An address information or data indicating the record end point $P_4$ is recorded at this time into a portion just ahead of the record end point, as will be described hereafter. At a point $P_5$ after lapse of e.g. a time interval $t_c$ from the point $P_4$, an erasure mode with the beam path iv is started to effect an erasure of about one track length. The signal erasure is completed at a point $P_6$ of the track $n+1$. Track jumping then is caused to occur within a time $\tau_j$ from this point $P_6$ so that the head unit is returned to the point $P_7$ within the extent of the beam path iii by which the recording has been made on the track n. The signals are reproduced along this beam path by the beam v from this point $P_7$ to reproduce the address data recorded during the terminal portion of the recording mode operation with the beam path iii. The recording end point $P_4$ is detected by virtue of these address data so that the recording mode operation by this beam path vi can be started from this point $P_4$.

Figure 5:
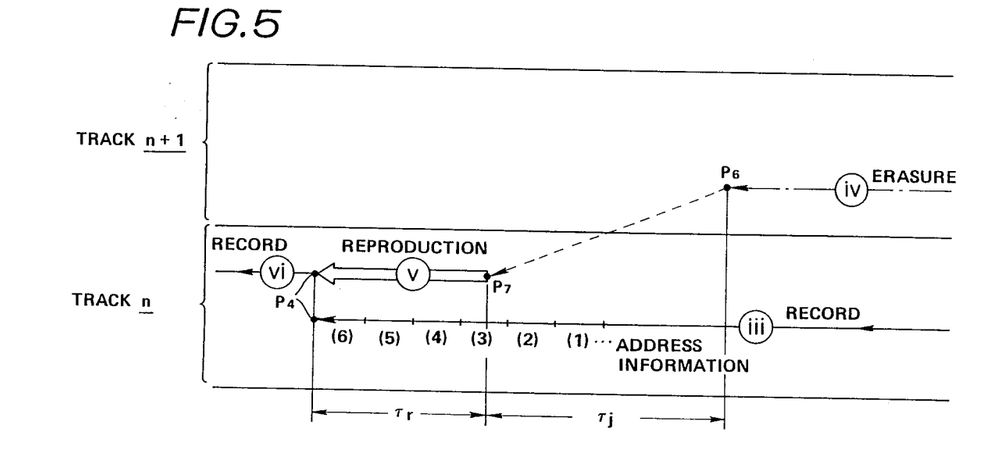
FIG. 5 is an enlarged schematic plan view showing the vicinity of the track jump position.

The switching or commutation timing from one mode to another is hereafter explained by referring to FIG. 5 showing in enlarged scale the vicinity of the track jump position encircled by dotted lines in FIG. 2.

In addition to the data to be recorded on the track, an address data or information specifying the record end point is also recorded on a predetermined terminal region of the magnetic recording by the beam path iii of FIG. 5 ahead of the record end point $P_4$.

With the use of e.g. the numerals "1" to "6" indicate address data, the address data incremented from "1" to "6" towards the record end point $P_4$ are recorded so that the recording is completed with recording of the numeral "6". During the reproduction after track jumping, these address signals are sequentially read so that the record end point $P_4$ is detected with the detection of the numeral "6". At this time, the mode is switched to the record mode to provide for continuous recording free from signal interruptions.

Example of Address Data Recording

Figure 6:
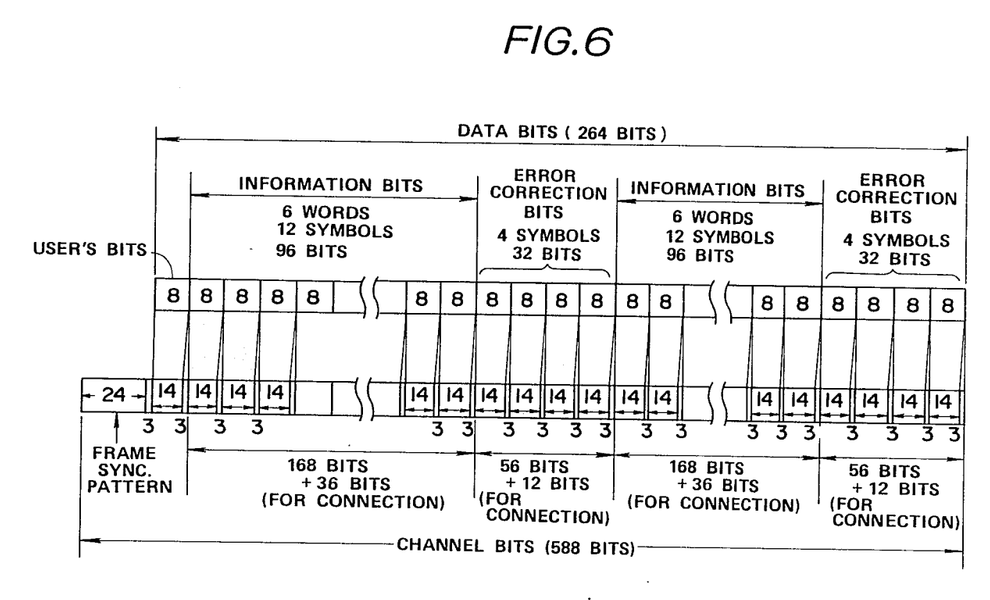
FIG. 6 is a block diagram of the signal encoding.

It is assumed that recording is performed on the opto-magnetic disk 1 in such a manner as to maintain signal convertibility with what is called a compact disk which is a kind of optical digital audio disk. FIG. 6 shows an example of signal recording. The audio signals are converted by an A/D converter into digital signals at a rate of 16 bits per sample. Each sample is divided into two equal parts each being one unit or symbol. To 12 words or 24 symbols of the information or data are added 4 symbols each of P and Q error check parity codes and a control or user's bit to give a complete processing unit or frame consisting of 33 symbols or 264 data bits. For recording the one-frame data bits on the disk, these data bits are subjected to what is called an eight-to-fourteen modulation or EFM for converting each symbol of the 8-bit data into a 14-bit pattern. A 24-bit sync. pattern is added to the beginning of each frame. The adjacent patterns are connected by three connection bits so that one frame of the recording pattern is formed by a total of 586 channel bits.

Figure 7:
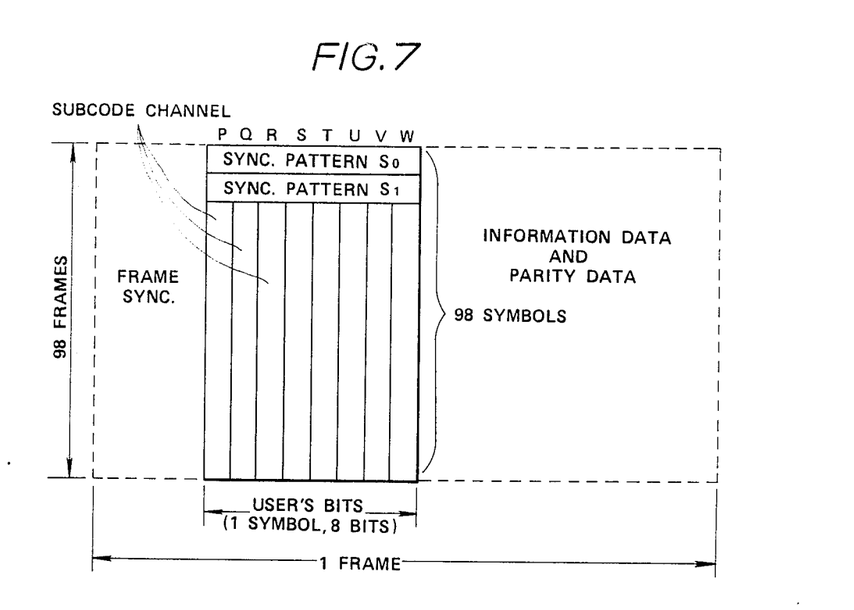
FIG. 7 shows a block construction of the subcode channel.

98 symbols corresponding to 98 frames of the 8 control or user's bits shown in FIG. 6 are collected into a block shown in FIG. 7, with the 8 bits of the respective 8-bit symbols making up eight sub-code channels P, Q, R, S, T, U, V, and W. For demarcating the block boundaries, block sync. patterns $S_0$, $S_1$ are annexed to two leading-end symbols of each block. The 14-bit patterns at the time of recording these sync. patterns $S_0$, $S_1$ are what are called out-of-rule patterns other than those used in EFM.

With the recording format, as described above, the address data for recording end point designation may be represented by using what is called the sub-coding portion within one frame, that is, the user's bit portion in the data bit format of FIG. 6, or the 14 bits next to the frame sync. pattern in the channel bit format of FIG. 6. When using the 14 bits next to the frame sync. pattern, a plurality of, for example, six out-of-rule patterns, that is, the patterns not contained in the EFM conversion table, are sorted out, to the exclusion of the sync. patterns $S_0$ and $S_1$, and the above described address data numerals, for example, "1" to "6", are sequentially allocated to these sorted out patterns. When using the user's bits, a plurality of bits, such as three bits, are selected from among the six bits corresponding to sub-code channels R to W and used for representing the address data numerals "1" to "6".

These address data are recorded in the sub-coding portions of, for example, six frames just ahead of the recording end point $P_4$, with the sequential order of "1" to "6", for example, in the proceeding direction. The record mode is completed after recording the 6-frame data signals in which the sub-coding portions, FIG. 6, have been sequentially substituted by the address data "1" to "6". It will be noted that, when the block sync. patterns $S_0$, $S_1$ are included in the sub-coding portions of these six frames, these patterns $S_0$, $S_1$ are used preferentially, so that, when the second and third frames correspond to the two leading frames of the block shown in FIG. 7, the sub-coding portions are recorded after the sub-coding portions which should indicate the address data "2" and "3" are replaced by the block sync. patterns $S_0$, $S_1$. Thus the sub-coding portions "1", $S_0$, $S_1$, "4", "5", "6" are recorded.

Example of Circuit Structure

Figure 8:
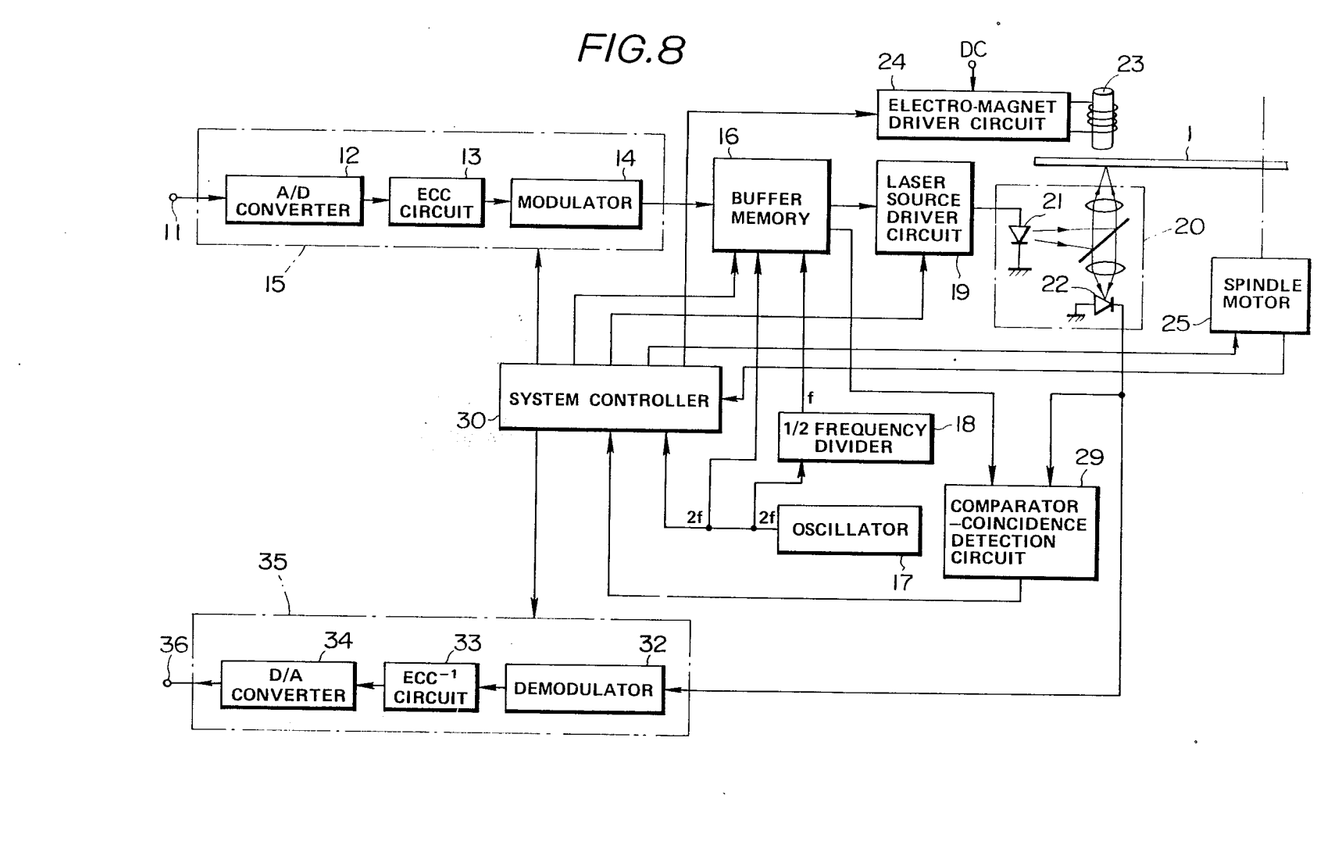
FIG. 8 is a block diagram showing a typical circuit of the signal recording and reproducing system.

A practical circuit for realization of the above described operational sequence is explained by referring to FIG. 8.

In this figure, the inforamtion signals such as audio signals are supplied to an input terminal 11. These input signals are supplied to a digital processing circuit 15 including an A/D converter 12, an ECC or error check code producing and inserting circuit 13, and an eight-to-fourteen modulator 14. This circuit 15 outputs 588 bit per frame digital signals, such as channel bit signals shown in FIG. 6, with the bit rate f equal to 4.32M bits per second. These digital signals are supplied to a buffer memory 16 adapted for time base compression and are written by write clock signals having the frequency equal to the bit rate f. On the other hand, these signals are read by read clock signals with a frequency 2f twice that used in writing to effect a ½ time axis compression as described hereinabove.

Figure 9:
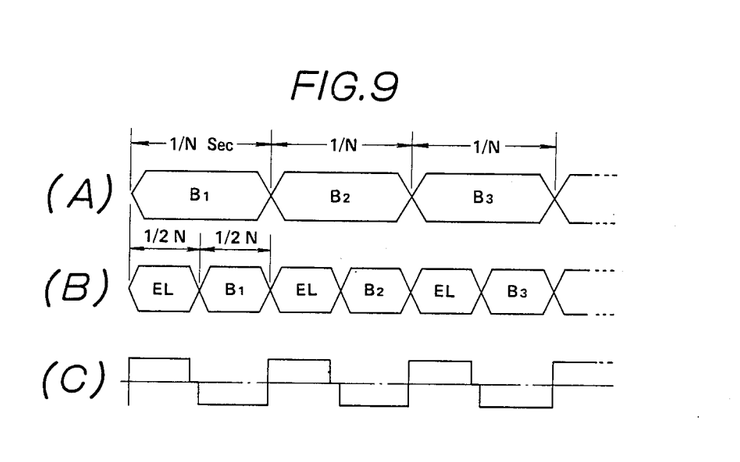
FIG. 9 consisting of (a)-(c) is a waveform diagram for the erasure and recording signals.

Such a state is shown in the waveform diagram of FIG. 9 wherein (A) demotes block data $B_1$, $B_2$, $B_3$ - - - read from the digital processing circuit 15 into the buffer memory 16; (B) denotes the same block data $B_1$, $B_2$, $B_3$, - - - read from the buffer memory after ½ time base compression and erasure signals EL having a constant erasure level; and (C) denotes magnetization inverting signals supplied to a magnet driving circuit 24.

Thus the clock signals having a frequency 2f are supplied from a clock signal generating pulse oscillator 17 and supplied to a read clock input terminal of the buffer memory 16. These clock signals having the frequency 2f are frequency divided by a ½ frequency divider 18 into clock signals having the frequency f so as to be then supplied to a write clock input terminal of the buffer memory 16.

The digital signals subjected to time base compression and read out from the buffer memory 16 are supplied to a laser source driving circuit 19 designed to drive a laser source, such as laser diode 21, of an optical head unit 20 adapted for optical recording and reproduction. The laser beam from this laser diode 21 is irradiated on a recording surface of the opto-magnetic disk 1 through an optical system such as lenses not shown. The head unit 20 also includes light receiving elements such as photodiode 22. For producing the bias magnetic field required for recording and/or erasure on the opto-magnetic disk 1, as described hereinabove, an electromagnet 23 is mounted adjacent to the disk 1. The magnet 23 is energized by the driver circuit 24 and thereby controlled in such a manner that the magnetic polarity is reversed at the time of switching between recording and erasure. The disk 1 is driven in rotation by a spindle motor 25.

The optical head unit 20 radiates the laser beam for erasure-recording as it follows the tracks of the disk 1, while detecting the reflected light from the disk 1 by a light receiving element such as photo-diode 22 for reading the recorded signals.

A system controller 30 controls the overall function of the above described recording-reproducing device. Thus it controls the formation of the recording digital signals at the digital processing circuit 15, read/write operation in the buffer memory 16, laser emission driving operation in the laser driver circuit 19, magnet excitation in the magnet driver circuit 24 and revolution of the spindle motor 25. When recording, the aforementioned address information or data, the control operation is performed in such a manner that the bit pattern data read from a ROM in which are previously stored channel bit patterns indicative of the address data "1" to "6" are written into the buffer memory 16 in substitution for the sub-coding portions of the six frames in the vicinity of the recording terminal portion. Alternatively, writing into the buffer memory 16 may be performed as usual and the address data bit signals supplied from the ROM may be supplied at the time of data reading to the laser driver circuit 19 in substitution for the sub-coding portions of the corresponding frames in the output digital signals. It is however necessary in this case that, similarly to the data from the buffer memory 16, the address data bit patterns from the ROM need be read with read clocks with a frequency 2f twice the customary frequency for effecting ½ time axis compression. When employing the above described user's bits, the address data may be introduced prior to the eight-to-fourteen modulation in the modulator 14 of the digital processing circuit 15.

The signal reproducing circuit comprises a reproduced data processing circuit 35 including a demodulator 32 for demodulating the signals read from photo-diode 22 which is the light receiving element of the optical head unit 20, an error check decode circuit 33 ($ECC^{-1}$ circuit) for effecting error correction on the basis of the parity word in the demodulated digital signals, and a D/A converter 34. The analog output signals from the D/A converter 34 of the processing circuit 35, such as audio signals, are taken at the output terminal 36.

During the signal reproduction immediately after the above described track jump of the erasure and recording mode, the read signals from photo-diode 22 are supplied to a comparator-coincidence detection circuit 29 where the signal patterns of the sub-coding portions of the respective frames are compared to the address data bit patterns from the buffer memory 16 for detecting the aforementioned address data "1" to "6", the detected output signals being then supplied to the system controller 30. The controller senses that the address data thus read and detected are changed from "1" to "6" in this order to determine the data end point and controls the reading of the buffer memory 16 and the driving of the laser driver 19 in such a manner that the next recording will be started from this recording end point. In case of dropout of a portion of the address data in the terminal six frames, for example, when the address data are replaced by, for example, the aforementioned block sync. patterns $S_0$ or $S_1$ or when the signal reading is not feasible because of the defect in the magnetic medium or error caused in recording and/or reproduction, the system controller 30 proceeds to the estimation of the recording end point on the basis of the address data before and after the dropout for starting the next recording at the thus estimated end point. It will be noted that the starting of the track jump (point $P_6$ in FIG. 2, for example) can be determined by the system controller 30 by sensing the state of rotation of the spindle motor 25 used for disk rotation. As for the terminal point, it is necessary for the system controller 30 to control the track jump in such a manner that the terminal point of the track jump, such as point $P_7$ in FIG. 2, will be located with a certain allowance within the range of the six address data frames in the vicinity of the recording end of the previously recorded track. For example, it is assumed that, with the beam path v sweeping the track for reproduction, the time required for positive sensing of the address data is $\tau_r$. Then it is necessary for the system controller 30 to effect a control so as to start the track jumping at a time $(\tau_r + \tau_j)$ before the time of reaching the point $P_4$ on the basis of the timing of the end point $P_4$ of the previous recording, the time necessary for completing the sweeping of the current track, and the aforementioned time periods $\tau_r$ and $\tau_j$.

The address data just after the completion of the track jumping can be determined on the basis of the output from the demodulator 32 of the processing circuit 35 or the output from the $ECC^{-1}$ circuit 33.

During the normal reproduction mode operation, the rotational speed of the disk 1 is controlled so as to be equal to the predetermined normal linear speed and the reproduction signals are obtained by the processing circuit 35.

In this manner, the signal erasure and the recording of the time-axis-compressed signals can be completed within a time interval equal to the normal signal reproduction time interval thus resulting in an apparently real-time recording within a time interval equal to the signal reproduction time interval. Above all, continuous signals such as audio signals can be recorded easily. As for the recording of the time-axis-compressed signals on each track, the address data in the vicinity of the end portion of the previously recorded area are read, and the next recording is started at the recording end point, under the operation of the system controller, resulting in a high precision connection of the recording signals and in elevated signal continuity.

It is to be noted that the present invention is not limited to the above described specific embodiment, but may comprise a number of modifications. For example, the signals to be recorded may also include computer data signals in general or video signals besides the audio signals. The rotational speed of the magnetic disk during the erasure and recording mode operation need not be twice but may be thrice or fourth etc. that during the reproduction mode operation. It is however to be noted that a laser power output equal to $\sqrt{n}$ times is required to effect the signal erasure at the speed n times that during the reproduction mode operation.

What is claimed is:

1. A signal recording and reproducing apparatus for use with an opto-magnetic disk comprising:
   an opto-magnetic disk having a large number of concentric recording tracks on which the information signals are recorded;
   a head unit for recording signals on said disk or reproducing recorded signals therefrom;
   recording means for supplying recording signals or erasing signals to said head unit;
   reproducing means for reproducing signals read by said head unit; and
   control means operable so that, in the case of recording information signals on said disk, said recording means are caused to consecutively sweep a given track on said disk at least twice within a time interval required for reproducing said track and so that said head unit is switched between a first sweeping time and a second sweeping time in such a manner that said recording means will supply erasing signals to said head unit during said first sweeping time and time-base-compressed recording signals thereto during said second sweeping time, said control means controlling said track jumping means to cause said head unit to jump tracks so as to move said head unit between adjacent tracks which have been recorded on said disk.

2. A signal recording and reproducing apparatus according to claim 1 characterized in that said recording means comprises a digital processing circuit for converting said information signals into corresponding digital signals and a memory circuit adapted for time-base-compression of said digital signals.

3. A signal recording and reproducing device according to claim 2 characterized in that said memory circuit has a memory capacity at least sufficient to store the data recorded on the outermost concentric track.

4. A signal recording and reproducing device according to claim 2 characterized in that said recording means are adapted to supply during said second time sweeping address data indicative of the end of said sweeping to said head unit.

5. A signal recording and reproducing device according to claim 4 further comprising a comparator-coincidence circuit for comparing address data signals read from said head unit and said address data supplied from said memory circuit for locating the end point of a track area on which recording has been made previously, the output of said comparator-coincidence circuit being supplied to said control means, said control means then controlling said recording means and said head unit so as to start recording at said end point.

6. A signal recording and reproducing device according to claim 5 characterized in that said control means is adapted for estimating said end point in case of partial dropping of said address data on the basis of the address data before and after the dropped address data.

* * * * *